United States Patent
Delvit et al.

(10) Patent No.: US 10,288,523 B2
(45) Date of Patent: May 14, 2019

(54) METHOD AND DEVICE FOR CHARACTERISING OPTICAL ABERRATIONS OF AN OPTICAL SYSTEM

(71) Applicant: CENTRE NATIONAL D'ETUDES SPATIALES, Paris (FR)

(72) Inventors: Jean-Marc Delvit, Toulouse (FR); Christophe Latry, Toulouse (FR); Carole Thiebaut, Castanet-Tolosan (FR); Gwendoline Blanchet, Montauban (FR)

(73) Assignee: CENTRE NATIONAL D'ETUDES SPATIALES, Paris (FR)

( * ) Notice: Subject to any disclaimer, the term of this patent is extended or adjusted under 35 U.S.C. 154(b) by 133 days.

(21) Appl. No.: 15/685,832

(22) Filed: Aug. 24, 2017

(65) Prior Publication Data
US 2018/0067017 A1    Mar. 8, 2018

(30) Foreign Application Priority Data
Sep. 6, 2016 (FR) ...................................... 16 58275

(51) Int. Cl.
*G06K 9/00* (2006.01)
*G01M 11/02* (2006.01)
(Continued)

(52) U.S. Cl.
CPC ....... *G01M 11/0264* (2013.01); *G01J 3/0297* (2013.01); *G01J 3/28* (2013.01);
(Continued)

(58) Field of Classification Search
None
See application file for complete search history.

(56) References Cited

U.S. PATENT DOCUMENTS

| 8,490,034 B1* | 7/2013 | Torunoglu | G06F 17/5068 716/53 |
| 2004/0052426 A1 | 3/2004 | Landesman | |
| 2008/0189103 A1* | 8/2008 | Yoshioda | 704/226 |

FOREIGN PATENT DOCUMENTS

FR    2994488 A1    2/2014

OTHER PUBLICATIONS

Paxman, R.G. et al., "Optical misalignment sensing and image reconstruction using phase diversity", Journal of the Optical Society of America A, vol. 5, No. 6, Jun. 1, 1988, p. 914, XP055175979.
(Continued)

*Primary Examiner* — Atiba O Fitzpatrick
(74) *Attorney, Agent, or Firm* — Burris Law, PLLC (57) ABSTRACT

The invention relates to a method and device for characterizing at least one optical aberration of an optical system of an image acquisition device, the optical system having an associated optical transfer function that is dependent on the aberrations, the image acquisition device being capable of acquiring at least two images in a field of image capture in a manner so as to introduce a differential aberration between the two images, each image being defined by a digital image signal. The method includes the obtaining (50) of a first image and a second image of a same given zone of the field of image capture, the second image being acquired with a differential aberration (Δaberr) relative to the first image, each image acquisition having an associated optical transfer function. An optical aberration is characterized (58, 60) by the calculation of at least one parameter by minimization of a functional expressed as a function of the first and second images acquired, from a modelling of the optical transfer functions associated with the two image acquisitions dependent on the aberrations of the image acquisition device as well as on the differential aberration (Δaberr).

13 Claims, 3 Drawing Sheets

(51) Int. Cl.
*G01J 3/02* (2006.01)
*G01J 3/28* (2006.01)

(52) U.S. Cl.
CPC ....... *G01J 3/2823* (2013.01); *G01M 11/0207* (2013.01); *G01M 11/0292* (2013.01); *G01J 2003/2826* (2013.01)

(56) References Cited

OTHER PUBLICATIONS

Schectman, Y. et al., "Phase Retrieval with Application to Optical Imaging: A contemporary overview", IEEE Signal Processing Magazine, IEEE Service Center, Piscataway, NJ, US, vol. 32, No. 3, May 1, 2015, pp. 87-109, XP011577486.
Search Report issued in connection with French patent application No. 1658275, dated Jun. 28, 2017, 2 pages.

\* cited by examiner

METHOD AND DEVICE FOR CHARACTERISING OPTICAL ABERRATIONS OF AN OPTICAL SYSTEM

The present invention relates to an optical aberration characterisation method for characterising at least one aberration of an optical system of an image acquisition device that is capable of acquiring at least two images in a field of image capture, the second image having a differential aberration relative to the first. The invention also relates to an associated device and an associated computer programme.

The invention belongs in the field of active optics, consisting of measuring and compensating for optical defects, also referred to as aberrations, in image acquisition devices.

The invention is applicable in particular in the field of space imagery. In this field, the image acquisition devices comprise telescopes provided with mirrors. In order to obtain a good image capture resolution it is essential to produce a telescope having the least possible aberrations in so as to attain the physical limits imposed by diffraction. This is difficult to achieve for several reasons: the relative shakes of the mirrors that constitute the optical combination, the quality of production of the optical surfaces of the mirrors, the mechanical stability over time with respect to the thermoelastic stresses and gravity induce optical aberrations. The measurement and compensation of optical aberrations thus make it possible to significantly reduce the production complexity in producing such optical systems.

The characterisation of and compensation for optical aberrations, in particular focusing defects, is particularly useful in the domain of image acquisition by along-track (along the swath) scanning (also known as "push broom" scanning), carried out by the fixing of arrays of image detectors on a satellite and the orbiting of the satellite over the scene captured in the field of image capture.

Finally, in the general consumer photography/image acquisition domain, photographic cameras are equipped with lens objectives, whose focal length is adjusted by moving the lenses. In this domain as well, it is useful to have available an automatic aberration characterisation system for characterising of optical aberrations, in particular a focusing defect. There exist various systems that provide the ability to carry out a focusing adjustment and control, known as autofocus systems. It is also useful to provide, for certain general consumer image acquisition devices, an alternative aberration estimating method for automatic estimation of aberrations such as defocusing for example.

To this end, the invention provides an optical aberration characterisation method for characterising at least one optical aberration of an optical system of an image acquisition device, the optical system having an associated optical transfer function that is dependent on the aberrations, the image acquisition device being capable of acquiring at least two images in a field of image capture in a manner so as to introduce a differential aberration between the two images, each image being defined by a digital image signal.

This method comprises the following steps:
obtaining of a first image and a second image of a same given zone of the field of image capture, the second image being acquired with a differential aberration relative to the first image, each image acquisition having an associated optical transfer function;
use of a convolutional image formation model for the images acquired using an optical transfer function that is dependent on at least one optical aberration;
calculation of at least one parameter characterising at least one optical aberration by minimisation of a functional, defined using the convolutional model of image formation, expressed as a function of the first and second images acquired, from a modelling of the optical transfer functions associated with the two image acquisitions dependent on the one or more optical aberrations to be characterised as well as on the differential aberration.

Advantageously, the method of the invention provides the ability to estimate the optical aberrations of an image acquisition device based on two or more images presenting a known or estimated difference in aberration. Advantageously, the method of the invention is applicable to images for which the impact of the additional aberration is relatively small and imperceptible to a user. Such an image acquisition can be achieved in certain cases without modifying the image acquisition device.

The method according to the invention may have one or more of the characteristic features outlined here below.

The optical system to be characterised comprises at least one set of detector arrays arranged in a staggered configuration, and the said first and second images belong to the zones of overlap between adjacent detector arrays.

The optical system comprises a plurality of sets of detector arrays, each set of detector arrays having an associated acquisition spectral band, the method being applied to the set of zones of overlap of the different spectral bands corresponding to a same given zone of the field of image capture, in order to determine the aberrations related to each of these zones of the field of image capture.

The method is applied over at least one zone of overlap of each spectral band, in a manner so as to characterise the optical aberrations by spectral band.

The functional is further also dependent on a centroid wavelength associated with the acquisition spectral band, and the centroid wavelength is estimated during the minimisation of the said functional.

The functional is further also dependent on a spatial shift between the first image and the second images acquired, the said spatial shift being estimated during the minimisation of the said functional.

The calculation step for calculating at least one parameter characterising at least one optical aberration effectively implements a modelling of the said optical transfer function as a function of at least one coefficient of a decomposition in a Zernike polynomial basis of a wave front error associated with the optical system of the image acquisition device.

The minimisation of the functional is performed by an iterative estimation method.

The method comprises a modelling of each of the optical transfer functions associated with the image acquisitions by a polynomial of degree less than or equal to two, defined by the variables representative of the optical aberrations to be characterised and a minimisation of the said functional by a non-iterative method.

The value of differential aberration between the first and the second acquired image is estimated during the minimisation of the said functional.

The differential aberration between the first image and the second image is a relative defocusing between the first image and the second image.

According to another aspect, the invention relates to an optical aberration characterisation device for characterising at least one optical aberration of an optical system of an image acquisition device, the optical system having an associated optical transfer function that is dependent on the aberrations, the image acquisition device being capable of acquiring at least two images in a field of image capture in a manner so as to introduce a differential aberration between the two images, each image being defined by a digital image signal. This device comprises:

an image obtaining module for obtaining a first image and a second image of a same given zone of the field of image capture, acquired by the image acquisition device, the second image being acquired with a differential aberration relative to the first image, each image acquisition having an associated optical transfer function;

a processor that is capable of carrying out a calculation of at least one parameter characterising at least one optical aberration by minimisation of a functional expressed as a function of the first and second images acquired, using a convolutional model of image formation for the images acquired using an optical transfer function that is dependent on at least one optical aberration;

the said functional also being expressed as a function of a modelling of the optical transfer functions associated with the two image acquisitions dependent on the one or more optical aberrations to be characterised as well as on the differential aberration.

According to another aspect, the invention concerns a computer programme comprising of software instructions which, when operationally executed by a programmable device, effectively implements an optical aberration characterisation method for characterising at least one optical aberration of an optical system of an image acquisition device such as briefly described here above.

Other characteristic features and advantages of the invention will become apparent from the description that is provided here below, for purely illustrative purposes and without any limitation, with reference made to the appended figures, among which.

The method of the invention is applicable in the field of satellite imagery, but is not limited to this domain. It will be described here below in respect of its application to satellite imagery for the observation of a complex scene, for example in the context of observation of the Earth by satellite, it being understood that the method is applicable for the acquisition of any other type of image.

Figure 1:
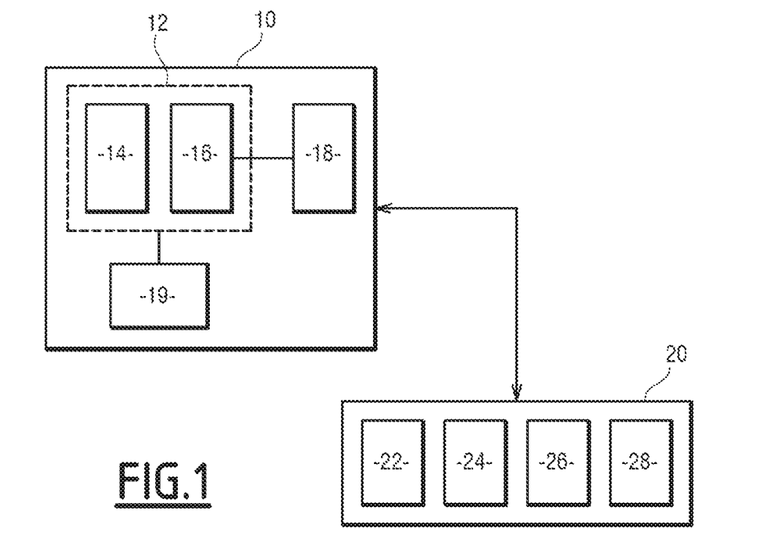
FIG. 1 schematically illustrates an image acquisition device and an optical aberration characterisation device for characterising optical aberrations according to one embodiment.

FIG. 1 schematically illustrates an image acquisition device 10 used in one embodiment of the invention.

The image acquisition device 10 includes an optical system 12, comprising an image forming optical element 14, for example one or more lenses and one or more detectors 16 that are capable of capturing the electromagnetic waves forming a light signal representative of a scene, such as a landscape, and of transforming it into an electrical signal. The optical system is capable of capturing one or more light signals, each belonging to a spectral band defined by a given wavelength interval.

For example, the optical system 12 comprises a plurality of one-dimensional arrays of detectors, also referred to as detector arrays.

Preferably, the optical system is capable of capturing a plurality of signals belonging to different spectral bands. In this case it is a multi-spectral optical system.

The optical system 12 is associated with a digitisation module 18, that makes it possible to transform the electrical signal into a digital image signal, sampled on a two-dimensional sampling grid.

In a known manner, a digital image signal is represented by a matrix of pixels, each pixel having a spatial position in the sampling grid and an associated radiometric value (or intensity). Such a representation of the digital image is referred to as representation in the spatial domain.

The image acquisition device 10 includes, on an optional basis, a focal plane shifting module 19 for shifting the focal plane that makes it possible to introduce a relative defocusing between images acquired successively by the optical system 12.

By way of a variant, the image acquisition device 10 includes a module 19 that makes it possible to introduce a differential aberration other than a relative defocusing.

Figure 3:
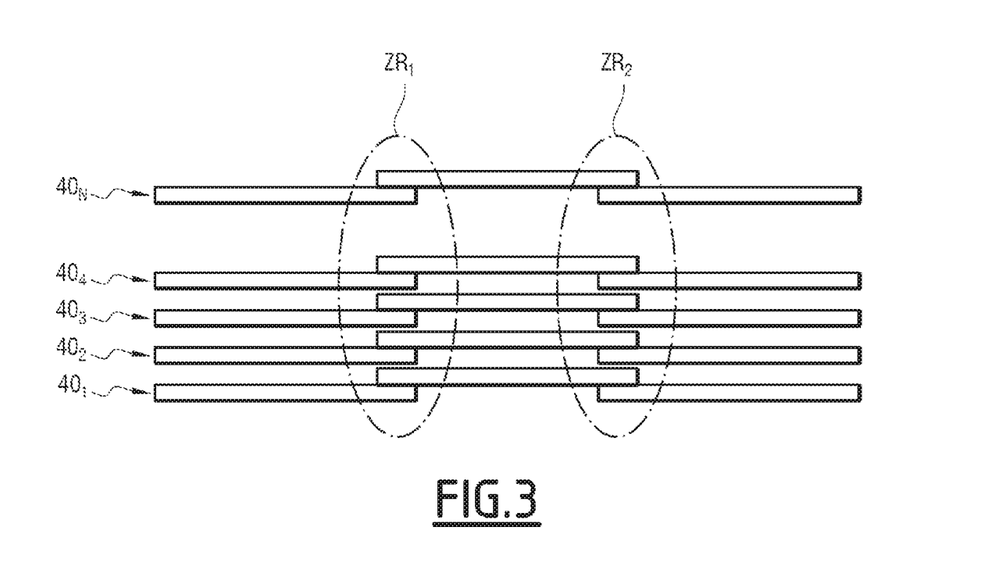
FIG. 3 is a schematic cross sectional view of an image acquisition device having arrays of detectors.

In one variant, the image acquisition device 10 does not include a specific module 19, but the method of the invention exploits the fact that each spectral band is acquired by multiple physical arrays arranged in a staggered configuration and forming a set of arrays, each array having an associated number, such that the images acquired by the even numbered arrays, referred to as even arrays, present an additional aberration as compared to the images acquired by the odd numbered arrays, referred to as odd arrays, as in the example illustrated hereinafter with reference made to FIG. 3. In this variant, the zones of overlap ZR between even and odd arrays are exploited. This makes it possible to have multiple measurements in a same given place of the field of image capture by exploitation of the homologous zones of overlap ZR of each of the spectral bands, and thereby to improve the measurement performance by averaging and filtering in the absence of chromaticism, or to measure this chromaticism if it exists. The measurement in all of the zones of overlap ZR provides access to the optical aberrations across the entire field of capture of the optical system.

Two sets of zones of overlap, respectively denoted as $ZR_1$ and $ZR_2$, are represented in FIG. 3.

The image acquisition device 10 is connected, by any suitable connection means, for example via a data transmission bus, to a data processing device 20, provided with one or more processors, and capable of operationally executing the programmes comprising of the software instructions suitable for effectively implementing the optical aberrations characterisation method according to the invention.

The data processing device 20 includes an image reception module 22 for receiving digital images from the image acquisition device 10 and an image processing module 24 for processing the digital images received. The processing device 20 also includes an optical aberration estimation module 26 for estimating desired optical aberrations by minimisation of a functional that is dependent on two images acquired with a differential aberration.

Finally, the processing device 20 includes a module 28 for using of the one or more parameters characterising the optical aberrations calculated by the calculation module 26 for a calculative correction of the acquired image signal in order to optimally compensate for the impact of aberrations on the image or for obtaining an adjustment instruction for adjusting of the focus of the image acquisition device 10, which is transmitted for example to the module 19 of this device.

Figure 2:
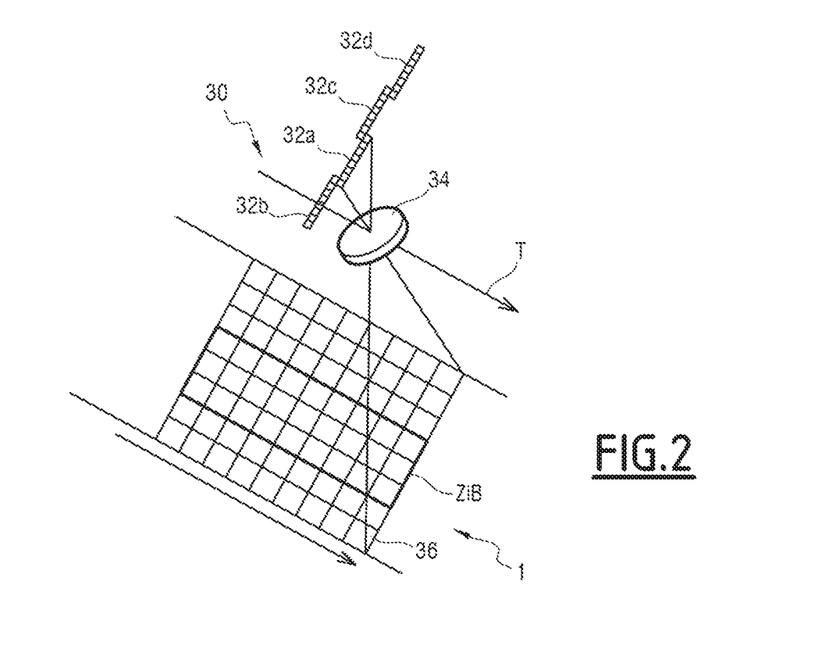
FIG. 2 schematically illustrates an image acquisition device for acquiring images via satellite.

FIG. 2 schematically illustrates an image acquisition device in the context of acquisition of digital images via satellite.

A satellite not represented, having a travel path T, is provided with an image acquisition device comprising an optical system 30.

The optical system 30 comprises a plurality of detector arrays 32a, 32b, 32c, 32d.

The acquisition of a landscape observed is effected via a telescope 34. Each detector of a detector array carries out the acquisition of a portion of the scene (also referred to as landscape) observed, recorded and stored in a digital image matrix I in the form of an image sample 36 or pixel in the single acquisition zones, for which a single detector array receives a light flux. Each image pixel has an associated radiometric value.

The image acquisition device 30 has, in the inter-array zones of overlap, a differential aberration, for example a relative defocusing.

Advantageously, this differential aberration is intentionally introduced and known.

FIG. 3 schematically illustrates a cross sectional view of the arrays of detectors in an image acquisition device as described above.

In the case of satellite imagery, an image acquisition device comprises several sets of arrays of detectors, respectively denoted as $40_1$, $40_2$, $40_i$, $40_j$, $40_{N-1}$, $40_N$, corresponding to an acquisition of images belonging to N spectral bands.

Each set of arrays $40_i$ includes one or more inter-array overlap zones, as illustrated in FIG. 3 where zones $ZR_1$ and $ZR_2$ are observed.

In practice, in one embodiment, the zones of overlap have a width that is greater than a given number of pixels, for example 50 pixels.

For example, in one embodiment, the sets of detector arrays $40_i$ each correspond to a multi-spectral channel, associated with a given narrow spectral band, in multi-spectral mode, and the set $40_N$ corresponds to the panchromatic image capture mode, referred to as panchromatic channel, corresponding to a wide spectral band and having a higher spatial resolution than the other multi-spectral channels.

In a conventional manner, a resolution ratio of 4 exists between the panchromatic channel and each multi-spectral channel.

In a first embodiment, there exists a focus differential, also referred to as a shift, resulting from native defocusing between the focal planes of the set $40_N$ and of any one of the set $40_i$, and this shift is estimated and used in the optical aberrations characterisation method as explained in detail here below.

In similar fashion, in this embodiment, a focus shift between the focal planes of two sets of arrays $40_i$ and $40_j$, in the inter-array overlap zones, are estimated and used in the optical aberrations characterisation method as explained in detail here below.

In a second embodiment, a predetermined focus shift is controlled and introduced, by construction, between sets of selected arrays, in a manner so as to build an optical system that is capable of performing a predetermined focus shift. In this embodiment, this predetermined focus shift is used in the optical aberration characterisation method. Advantageously, the introduction of a differential defocus aberration that could go up to 200 nm between multi-spectral bands has a negligible impact on the quality of images due to the resolution ratio of the multi-spectral channels with the panchromatic channel.

More generally, a value of differential aberration other than a relative defocusing is intentionally introduced between sets of arrays selected.

According to one embodiment, the determination of optical aberrations only exploits the zones of overlap of each spectral band, by exploiting the differential aberration existing among images acquired by the even and odd arrays. Advantageously, it is then possible to characterise the optical aberrations by spectral band, that is also referred to as chromatic aberrations.

In addition, the determination of optical aberrations is done by zone of overlap, which advantageously provides the ability to characterise the optical aberrations based on their spatial position in the field of image capture.

Advantageously, the exploiting of the zones of overlap of each spectral band provides the ability to characterise the optical aberrations with a spatial and spectral location in the field of image capture of the image acquisition device.

In a known manner, any optical system is characterised by an optical transfer function, which is the Fourier transform of the optical impulse response or PSF (abbreviation for "Point Spread Function").

The optical transfer function is a complex function of the spatial frequencies, and the application of a Fourier transform to a digital image signal defined in a two-dimensional spatial domain results in a transformed image signal, defined in the frequency domain, each point having a modulus and a phase associated therewith.

The optical transfer function characterises the blur introduced by the optical system, thus the attenuation of the spatial frequencies. The ideal optical transfer function, also known as diffraction optical transfer function characterises the blur introduced in the absence of defects in the embodiment of the optical combination.

In practice, optical aberrations are introduced by the optical system, and as a consequence the real optical transfer function is different from the diffraction optical transfer function.

A digital image I, being derived from an image signal S representative of a scene captured, formed by an image acquisition device that includes a given optical impulse response optical system, is modelled as the convolution of the image signal S observed with the optical impulse response, and then the sampling on a two-dimensional grid and the addition of noise.

It should be noted that the sampling is in general accompanied by aliasing if Shannon's condition is not satisfied.

The impulse response h of an image acquisition device can be written as a convolution product of two terms:

$$h = h_{opt} * h_{det} \tag{EQ1}$$

Where the operator * denotes the convolution product, $h_{opt}$ is the optical impulse response, and $h_{det}$ is the impulse response of the detector, associated with the integration of photons by one elementary detector and with the possible eventual displacement of the detector that is part of the image acquisition device during the integration time.

The digital image I is thus written, using a convolutional model for image acquisition:

$$I = S * h_{det} * h_{opt} + b \tag{EQ2}$$

where b is a noise term.

The optical impulse response and the optical FTM which is its Fourier transform, are entirely determined by having knowledge of the wave front error (WFE) and the occulting mask (P) for obscuring the pupil of the objective lens of the image acquisition system, for example of the telescope in the case of satellite image acquisition.

It is sought to resolve the problem of phase diversity consisting of estimating the wave front error by using at least two images acquired on a same given landscape with a differential optical aberration.

The resolution of the phase diversity problem is based on a modelling, according to the convolutional model of image acquisition, of the couple of observed images, denoted $I_1$ and $I_2$, as a function of the aberrations desired, which are themselves represented in the form of a combination of Zernike polynomials, the unknowns being the weights $a_i$ of this combination defined here below.

The following relations are applied:

$$\{TF(S) \times FTM_{det} \times FTM_{opt}(WFE)\}_{rep} + TF(b_1) = TF(I_1) \quad (EQ3)$$

$$\{TF(S) \times FTM_{det} \times FTM_{opt+\Delta aberr}(WFE) \times RP_{2/1}\}_{rep} + TF(b_2) = TF(I_2) \quad (EQ4)$$

Where TF( ) is the Fourier transform, $FTM_{opt}$ denotes the optical transfer function (Fourier transform of $h_{opt}$) and $FTM_{det}$ is the Fourier transform of $h_{det}$. $RP_{2/1}$ is a linear phase ramp type frequency function representing in the Fourier domain the relative spatial shift of possibly non-zero value between the two images.

The value $\Delta aberr$ is associated with the additional differential aberration introduced or estimated, between the two images $I_1$ and $I_2$. The terms $b_1$ and $b_2$ denote the noise corresponding to the respective images $I_1$, $I_2$.

The expression $\{\ \}_{rep}$ indicates the possible presence of aliasing in the frequency domain, also known as spectral aliasing. The spectral aliasing phenomenon is already known.

The wave front error WFE is expressed in the orthonormal basis of Zernike polynomials by the relation:

$$WFE = WFE_{a\_priori} + \sum_{i \in \mathcal{J}} a_i Z_i \quad (EQ5)$$

Where $\mathcal{J}$ represents the set of indices of the Zernike polynomial basis corresponding to the desired optical aberrations, $Z_i$ is the Zernike polynomial of index i, and $a_i$ the corresponding coefficients of decomposition (or weights). Each Zernike polynomial is associated with a type of optical aberration, for example $Z_4$ represents the focusing error, commonly referred to as defocus, $Z_5$ and $Z_6$ two types of astigmatism etc.

The number of indices in $\mathcal{J}$ can be any number, for example comprised between 1 and 40.

Each value of the coefficient $a_i$ of the decomposition (EQ5) is representative of the corresponding aberration in the image considered. For example, the value of the coefficient $a_4$ is representative of the focusing error, it represents the mean squared error due to the defocusing.

In order to calculate the optical transfer functions (FTM$_{opt}$) associated with the wave front errors (WFE and WFE+$\Delta$aberr), of the two images $I_1$ and $I_2$ one relies on the following equation (EQ6):

$$FTM_{opt} = TF\left(\left|TF^{-1}\left(Pe^{\frac{i2\pi}{\lambda}WFE}\right)\right|^2\right) \quad (EQ6)$$

wherein P is the occulting mask and $\lambda$ the centroid wavelength of the spectral band considered (average weighted by the spectral mask of the spectral band and the spectral response of the landscape).

It should be noted that for a complex scene, for example a landscape observed by satellite imagery, the image signal S is unknown. The same is true of the modulus of the transfer function $FTM_{det}$ of the detector.

In its various embodiments, the invention proposes to use an acquisition of a couple of digital images $I_1$, $I_2$ representative of a same given portion of scene S, and presenting a differential aberration of value $\Delta aberr$, for example a difference in focus $\Delta aberr$, which is determined by construction or by estimation.

For the first digital image $I_1$, the relation (EQ3), considering that the noise is negligible, is written as follows:

$$\{TF(S) \cdot FTM_{det} \cdot FTM_{opt}\}_{rep} = TF(I_1) \quad (EQ7)$$

The term WFE has been omitted so as to simplify the writing of the equations.

Considering that the differential aberration value $\Delta aberr$ is applied to the second image $I_2$ with respect to the first image $I_1$, the relation (EQ4) is written as follows:

$$\{TF(S) \cdot FTM_{det} \cdot FTM_{opt+\Delta aberr}\}_{rep} = TF(I_2) \quad (EQ8)$$

It should be noted, however, that for a second image $I_2$ presenting a differential aberration having a high value $\Delta aberr$, for example defocus of 200 nm, a significant amount of blur is introduced into this second image, and as a consequence this second image includes little high spatial frequencies and very low aliasing.

Advantageously, the invention proposes to minimise a functional Func, obtained based on the relations (EQ7) and (EQ8), which does not require having knowledge of the signal S, or of the transfer function specific to the detectors $FTM_{det}$.

The functional is obtained by eliminating from the two equations (EQ7) and (EQ8) the common term TF(S) $FTM_{det}$.

In one embodiment, the functional Func to be minimised is given by:

$$Func = \frac{1}{2\sigma^2} \int\int \frac{TF(I_2) \cdot FTM_{opt} - TF(I_1) \cdot FTM_{opt+\Delta aberr}}{|FTM_{opt}|^2 + |FTM_{opt+\Delta aberr}|^2 + \varepsilon} df_x df_y \quad (EQ9)$$

Where $\sigma^2$ is the variance of the average radiometric noise b of each of the two images, $f_x$ and $f_y$ represent the spatial frequencies, $\varepsilon$ a correction term that avoids the numerical instabilities for the frequencies rendering the denominator close to 0. For example, $\varepsilon$ may take the value $10^{-12}$.

The variance $\sigma^2$ is estimated by applying for instance a noise model of the type: $\sigma^2 = \sqrt{A^2 + B \cdot Avg}$, where Avg is the average of the image $I_1$, and A and B are actual values depending on the instrumental characteristics of the image acquisition device.

The use of the parameter $\sigma^2$ is optional since the stop criterion for stopping the minimisation of the functional pertains to the relative value of the functional between two iterations. Nevertheless, the availability of such a model advantageously makes it possible to eliminate the extremely noisy images and provides a confidence index on the estimation, a good estimate corresponding to a final functional value close to 1.

Advantageously, the expression (EQ9) of the functional Func to be minimised does not include the terms TF(S) and $FTM_{det}$ which are not known.

Several embodiments are contemplated for the calculation of optical aberrations based on the minimisation of the functional Func.

Figure 4:
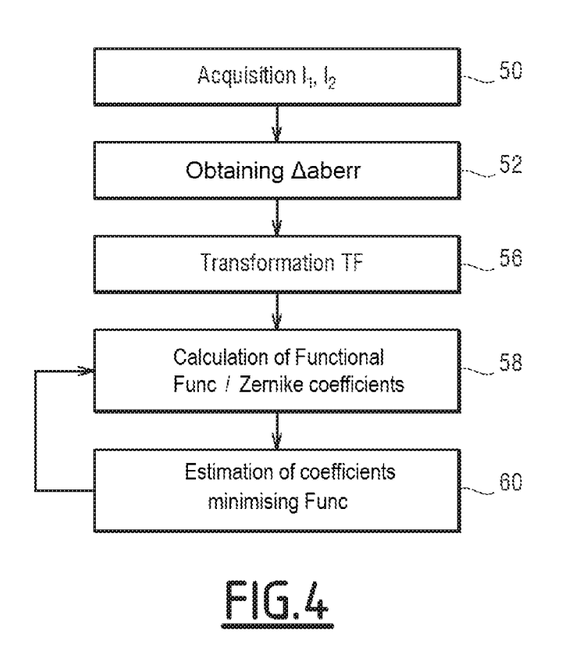
FIG. 4 is a flowchart of the main steps of an optical aberration characterisation method for characterising an optical aberration according to a first embodiment of the invention.

FIG. 4 is a flowchart of the main steps of an optical aberration characterisation method for characterising optical aberrations according to a first embodiment of the invention.

During a first step 50, the images, respectively a first image $I_1$ and a second image $I_2$, presenting a differential aberration and corresponding to a same given scene, are obtained from an image acquisition device.

As already explained here above, in one embodiment this differential aberration is present in the image acquisition device, for example in the inter-array overlap zones in the case of an image acquisition device as described in FIG. 3.

In another embodiment a differential aberration is introduced intentionally, and the corresponding value Δaberr consequently is thus known.

In this other embodiment, a value Δaberr of differential aberration that is greater may be introduced, but it is not possible in this case for the second image $I_2$ obtained to exploited by a user application, except in the multispectral case mentioned here above. For example, when the differential aberration is a defocus, the second image $I_2$ has a fairly large amount of blur.

The differential aberration value Δaberr is obtained in the step 52.

In the embodiment in which the differential aberration is native to the image acquisition device, in the step 52 an initial value Δaberr of differential aberration is obtained, a refined value being obtained in the subsequent estimation step described here below.

A Fourier transform is then applied during a step of transformation 56 to the image signals, in order to obtain a first transformed image signal $TF(I_1)$ and a second transformed image signal $TF(I_2)$.

The transformation step 56 is followed by a modelling step 58 for modelling of the modulus of the optical transfer function.

As explained here above, it is then sought to minimise a functional Func, which depends on $TF(I_1)$, on $TF(I_2)$, and on the optical transfer functions associated with the two acquisitions and respectively denoted as $FTM_{opt}$ and $FTM_{opt+\Delta aberr}$.

An optical transfer function is written, in a known manner as the autocorrelation of the complex pupil function Pc, relative to the pupil of the objective lens of the image acquisition optical system.

$$FTM_{opt} = \text{autocorr}(P_c(x,y)) \quad (EQ10)$$

At a point (x, y), the complex pupil function is written as a function of the modulus P (x, y) and of the phase φ(x, y):

$$P_c(x,y) = P(x,y)e^{j\varphi(x,y)} \quad (EQ11)$$

The term P (x, y) is the binary bit mask having the value 1 on the pupil and 0 elsewhere.

The phase term φ(x, y), also referred to as aberrant phase represents the difference at point (x, y) between the phase of the actual light wave on the pupil plane and the phase of an ideal spherical wave.

The wave front error WFE (x, y) may be characterised by the following formula:

$$\varphi(x, y) = \frac{2\pi}{\lambda} WFE(x, y) \quad (EQ 12)$$

Where λ is the centroid wavelength of the spectral band considered. The wave front error is expressed in the orthonormal basis of Zernike polynomials according to formula (EQ5) repeated here below $$WFE(x, y) = WFE_{a\_priori}(x, y) + \sum_{i \in \mathcal{J}} a_i Z_i(x, y) \quad (EQ 5)$$

Each coefficient value $a_i$ of the decomposition is representative of the corresponding aberration.

Thus, for the given values of the coefficients $a_i$, the wave front error is obtained according to the formula (EQ5), and by combining the formulas (EQ10), (EQ11) and (EQ12) the optical transfer function $FTM_{opt}$ is deduced therefrom.

In one embodiment, the step 60 effectively carries out an iterative estimation, by causing to change the respective values of the coefficients $a_i$ to the extent of minimising the functional Func. For example, the Levenberg-Marquardt algorithm, or any other iterative minimisation algorithm is used.

The stop criterion for stopping the iterations focuses on the relative value of the functional between two iterations: convergence is deemed to be reached when this relative value is lower than a predetermined threshold value.

In one embodiment, during the iterative estimation step, also estimated are the centroid wavelength λ and the spatial shift between the two images $I_1$ and $I_2$, represented by the term $RP_{2/1}$ in the equation (EQ4), which are also unknown, starting from predetermined initial values.

In addition, when the differential aberration is inherent (also called native) in the image acquisition device, the value Δaberr of the differential aberration is also estimated during the step of iterative estimation in the step 60.

Figure 5:
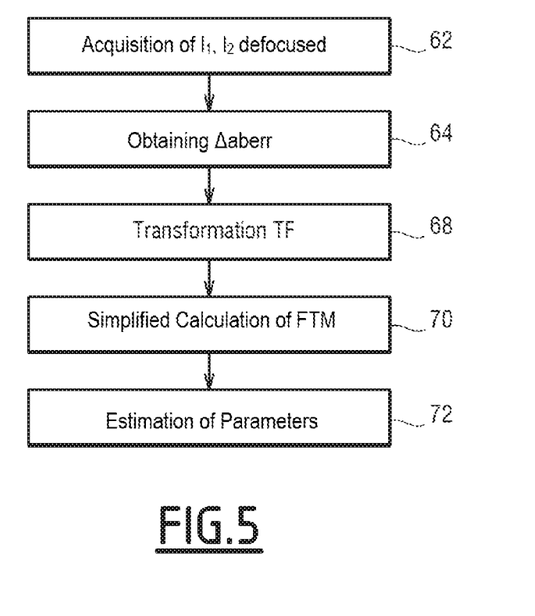
FIG. 5 is a flowchart of the main steps of an optical aberration characterisation method for characterising an optical aberration according to a second embodiment of the invention.

FIG. 5 is a flowchart of the main steps of an optical aberration characterisation method according to a second embodiment of the 'invention.

The steps 62 to 68 are analogous to the steps 50 to 56 of the first embodiment and shall not be described in greater detail here.

The step of application of a Fourier transformation 68 is followed by a calculation step for calculating of the moduli of the respective optical transfer functions denoted as $FTM_{opt}$ and $FTM_{pot+\Delta aberr}$ based on a simplification of the formulas applicable when the aberrant phase φ(x, y) associated with the representation of the complex pupil function is of low amplitude.

In this case, a development limited, for example to the second order is applied:

$$e^{j\varphi} \approx 1 + j\varphi - \frac{\varphi^2}{2} \quad (EQ 13)$$

The optical transfer function can thus then be written in the form of a limited development:

$$FTM_{opt} \approx FTM_{opt}(WFE_{a\,priori}) + \sum_{i \in L} \alpha_i a_i + \sum_{k,l \in L} \beta_{kl} a_k a_l \quad (EQ 14)$$

Where $FTM_{opt}(WFE_{a\ priori})$ is the optical transfer function corresponding to the a priori knowledge of the WFE of the optical system, the terms $\{a_i\}$ are the coefficients of the decomposition of the wave front error based on the Zernike polynomials, L is the subset of indices of the Zernike polynomials to be used to represent the aberrant phase and the terms $\{\alpha_i\}$, $\{\beta_{kl}\}$ are frequency functions.

Thus, the optical transfer functions associated with the two image acquisitions are modelled by two polynomials of degree less than or equal to 2, whereof the variables $a_i$, $a_l$ are representative of the desired aberrations.

In one particular case, when the only desired optical aberration is a defocusing defect, only the coefficient $a_4$ corresponding to the Zernike polynomial $Z_4$ is not zero, and the formula (EQ14) is reduced to:

$$FTM_{opt} \approx FTM_{opt}(WFE_{a\ priori}) + \alpha_4 a_4 \quad (EQ15)$$

The expression (EQ14) or the expression (EQ15) is used in the expression of the functional to be minimised.

The step 70 is followed by an estimation step 72 for estimating the values of $a_4$ and $\beta_4$ that make it possible to minimise the functional Func, and as a consequence thereof $a_4$, the value characterising the defocus aberration is obtained.

The value of $a_4$ obtained is then exploited in a subsequent use step, for example for correcting the adjusting of the image capture focus, or for finely deconvolving the image $I_2$ by means of algorithmic processing.

Advantageously, the use of the expression (EQ14) simplifies the calculation of the functional and allows for non-iterative minimisation, thus enabling a reduction of the computational load.

Figure 6:
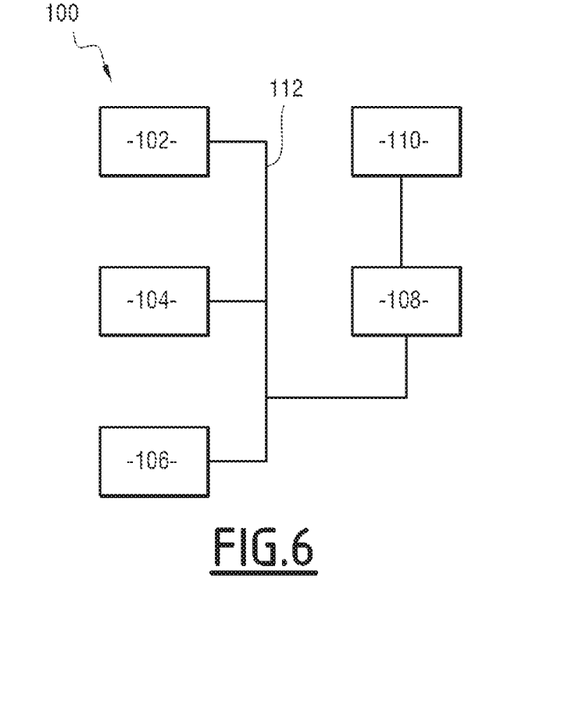
FIG. 6 is a block diagram of the main modules of a programmable device that is capable of operationally implementing the method of the invention.

The various embodiments of the optical aberration characterisation method for characterising optical aberrations according to the invention are operationally implemented by a type of programmable device such as a computer, workstation, the main functional blocks of which are illustrated in FIG. 6.

A programmable device 100 that is capable of operationally implementing the methods of the invention comprises a central processing unit 108, or CPU, capable of executing computer programme instructions when the device 100 is powered on. In one embodiment, a multi-processor central processing unit is used, providing the ability to perform parallel computations. The device 100 also includes information storage means 110, for example, registers, that are capable of storing executable code instructions enabling the effective execution of programmes comprising of code instructions capable of carrying out the aberration characterisation method for characterising the optical aberrations of an optical system according to the invention.

The device 100 comprises the control means 104 providing the ability to update the parameters and to receive commands from an operator. When the programmable device 100 is a device installed onboard, the control means 104 comprise a telecommunication device that makes it possible to receive commands and values for remote parameters.

Alternatively and in an optional manner, the control means 104 are input means for inputting commands by an operator, for example a keyboard.

In an optional manner, the programmable device 100 includes a screen 102 and an additional pointing means 106, such as a mouse.

The various functional blocks of the device 100 described here above are connected via a communication bus 112.

In one embodiment, the device 100 is an ASIC (Application Specific Integrated Circuits), an FPGA (Field Programmable Gate Arrays), or a processor.

An optical aberration characterisation system for characterising the optical aberrations of an optical system of an image acquisition device according to the invention includes an image acquisition device, such as the image acquisition device 10 of FIG. 1 and a device that is capable of effectively implementing the method for characterising the optical aberrations of an optical system as described here above.

Advantageously, the method of the invention described here above provides the means to obtain the characterisation of optical aberrations with a value of differential aberration, for example, a focus shift that is inherent (native) or intentionally introduced.

The invention claimed is:

1. An aberration characterisation method for characterising at least one optical aberration of an optical system of an image acquisition device, the optical system having an associated optical transfer function that is dependent on the aberrations, the image acquisition device being capable of acquiring at least two images in a field of image capture in a manner so as to introduce a differential aberration between the two images, each image being defined by a digital image signal, characterised in that it comprises the following steps:
   obtaining of a first image and a second image of a same given zone of the field of image capture, the second image being acquired with a differential aberration relative to the first image, each image acquisition having an associated optical transfer function;
   use of a convolutional image formation model for the images acquired using an optical transfer function that is dependent on at least one optical aberration;
   calculation of at least one parameter characterising at least one optical aberration by minimisation of a functional, defined using the convolutional model of image formation, expressed as a function of the first and second images acquired, from a modelling of the optical transfer functions associated with the two image acquisitions dependent on the one or more optical aberrations to be characterised as well as on the differential aberration.

2. A method according to claim 1, wherein the optical system to be characterised comprises at least one set of detector arrays arranged in a staggered configuration, and in which the said first and second images belong to the zones of overlap between adjacent detector arrays.

3. A method according to claim 2, wherein the optical system comprises a plurality of sets of detector arrays, each set of detector arrays having an associated acquisition spectral band, the method being applied to the set of zones of overlap of the different spectral bands corresponding to a same given zone of the field of image capture, in order to determine the aberrations related to each of these zones of the field of image capture.

4. A method according to claim 2, applied over at least one zone of overlap of each spectral band, in a manner so as to characterise the optical aberrations by spectral band.

5. A method according to claim 1, wherein the said functional is further also dependent on a centroid wavelength associated with an acquisition spectral band, and wherein the centroid wavelength is estimated during the minimisation of the said functional.

6. A method according to claim 1, wherein the said functional is further also dependent on a spatial shift between the first image and the second images acquired, the said spatial shift being estimated during the minimisation of the said functional.

7. A method according to claim 1, wherein the calculation of at least one parameter characterising at least one optical aberration effectively implements a modelling of the said optical transfer function as a function of at least one coefficient of a decomposition in a Zernike polynomial basis of a wave front error associated with the optical system of the image acquisition device.

8. A method according to claim 1, in which the minimisation of the functional is performed by an iterative estimation method.

9. A method according to claim 1, comprising a modelling of each of the optical transfer functions associated with the image acquisitions by a polynomial of degree less than or equal to two, defined by the variables representative of the optical aberrations to be characterised and a minimisation of the said functional by a non-iterative method.

10. A method according to claim 1, wherein a value of the differential aberration between the first and the second acquired image is estimated during the minimisation of the said functional.

11. A method according to claim 1, wherein the said differential aberration between the first image and the second image is a relative defocusing between the first image and the second image.

12. A computer programme comprising of software instructions which, when operationally executed by a programmable device, effectively implements an optical aberration characterisation method for characterising optical aberrations of an image acquisition device according to claim 1.

13. An optical aberration characterisation device for characterising at least one optical aberration of an optical system of an image acquisition device, the optical system having an associated optical transfer function that is dependent on the aberrations, the image acquisition device being capable of acquiring at least two images in a field of image capture in a manner so as to introduce a differential aberration between the two images, each image being defined by a digital image signal, characterised in that it comprises:
 an image obtaining module for obtaining a first image and a second image of a same given zone of the field of image capture, acquired by the image acquisition device, the second image being acquired with a differential aberration relative to the first image, each image acquisition having an associated optical transfer function;
 a processor that is capable of carrying out a calculation of at least one parameter characterising at least one optical aberration by minimisation of a functional expressed as a function of the first and second images acquired, using a convolutional model of image formation for the images acquired using an optical transfer function that is dependent on at least one optical aberration;
 the said functional also being expressed as a function of a modelling of the optical transfer functions associated with the two image acquisitions dependent on the one or more optical aberrations to be characterised as well as on the differential aberration.

* * * * *